L. W. MELCHER.
TRACTOR.
APPLICATION FILED MAR. 28, 1919.

1,318,785.

Patented Oct. 14, 1919.
3 SHEETS—SHEET 1.

Witness:
John Enders

Inventor:
Lee W. Melcher
by Fred Gerlach
his Atty.

L. W. MELCHER.
TRACTOR.
APPLICATION FILED MAR. 28, 1919.
1,318,785.
Patented Oct. 14, 1919.
3 SHEETS—SHEET 2.
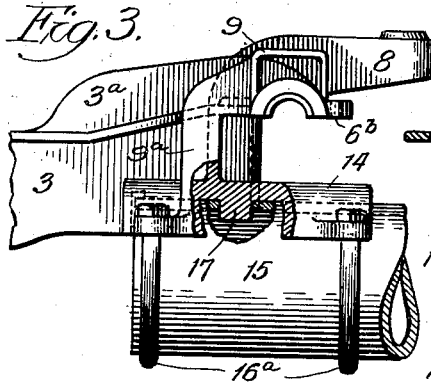
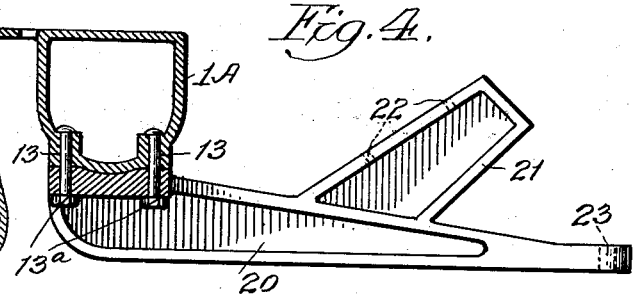
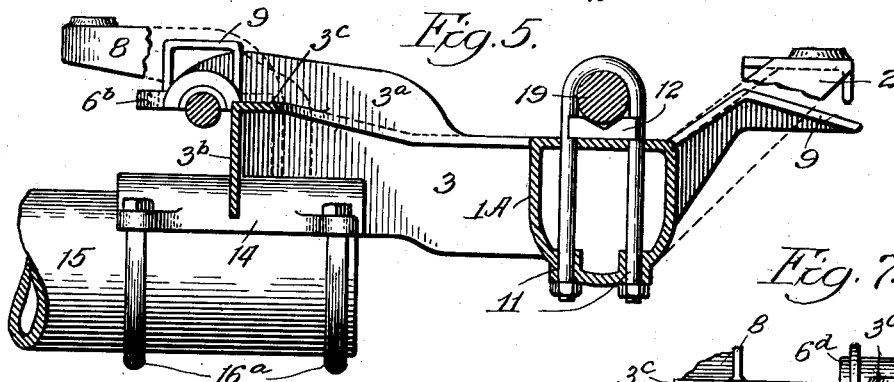
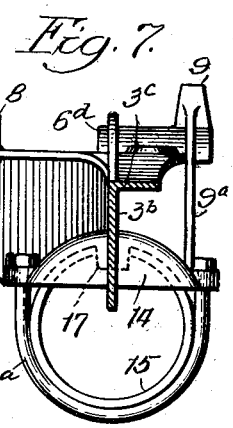
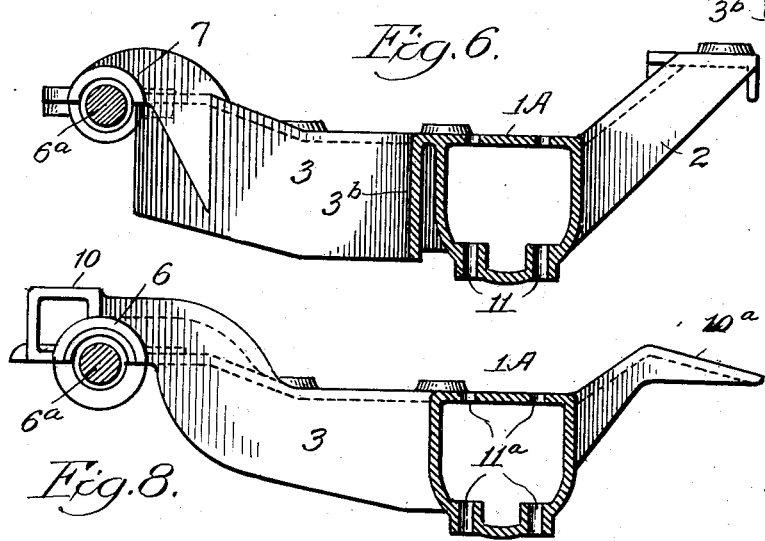
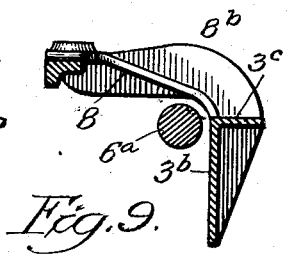
Witness:
John Enders
Inventor:
Lee W. Melcher
by Fred Gerlach
his Atty

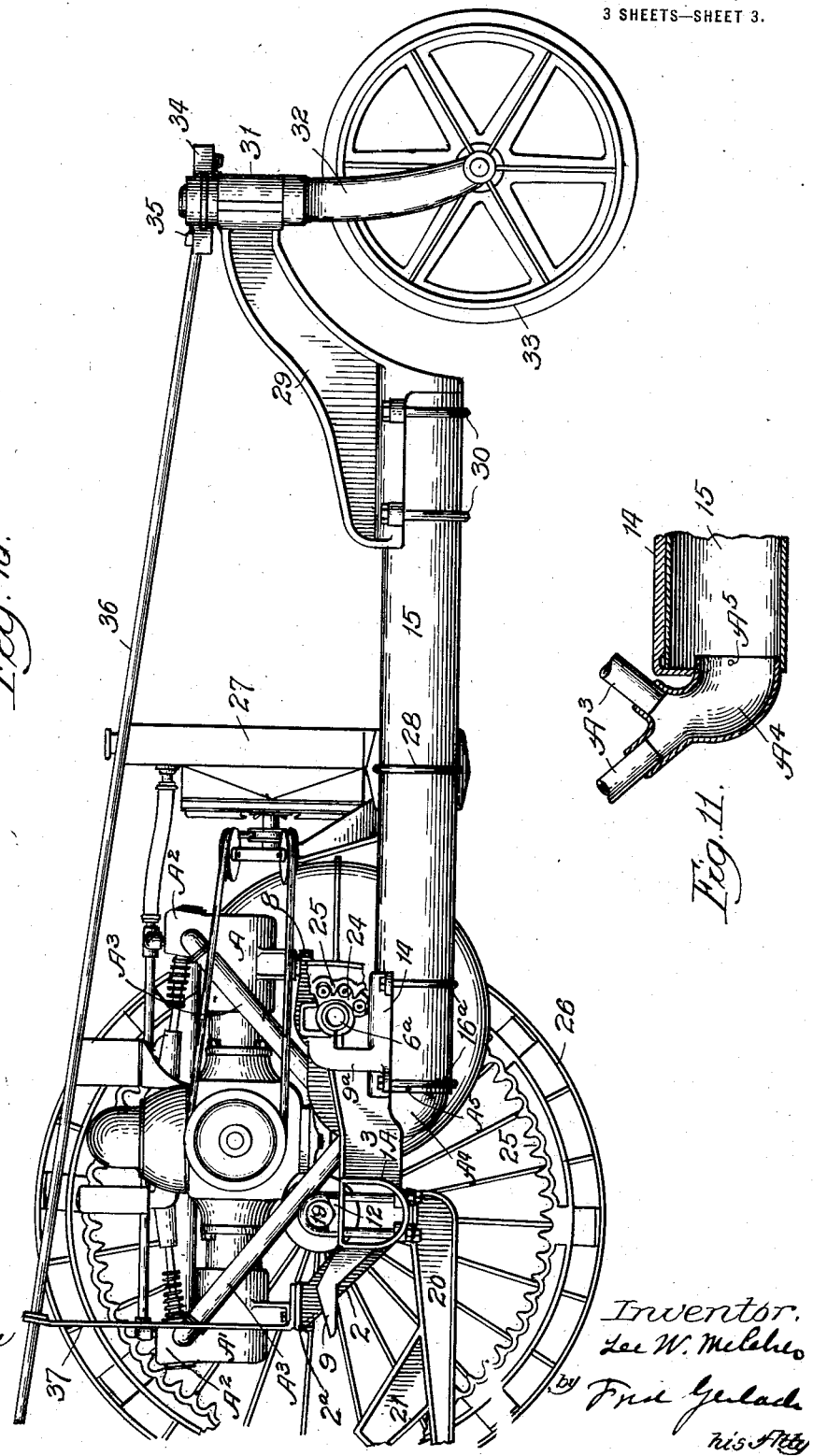

UNITED STATES PATENT OFFICE.

LEE W. MELCHER, OF LA CROSSE, WISCONSIN, ASSIGNOR TO LA CROSSE TRACTOR CO., OF LA CROSSE, WISCONSIN, A CORPORATION OF DELAWARE.

TRACTOR.

1,318,785.      Specification of Letters Patent.      Patented Oct. 14, 1919.

Original application filed March 9, 1916, Serial No. 83,107. Divided and this application filed March 28, 1919. Serial No. 285,745.

*To all whom it may concern:*

Be it known that I, LEE W. MELCHER, a citizen of the United States, and a resident of La Crosse, in the county of La Crosse and State of Wisconsin, have invented certain new and useful Improvements in Tractors, of which the following is a full, clear, and exact description.

The invention relates to tractors.

The object of the invention is to provide an improved supporting frame which is strong and durable and upon which the motor and other parts can be suitably attached, and which is of sufficient strength at the place of maximum stress and comparatively light in weight.

Other objects of the invention will be apparent from the detailed description.

The present application is a disivion of Serial No. 83,107, filed by me March 9, 1916.

The invention consists in the several novel features hereinafter set forth and more particularly defined by claims at the conclusion hereof.

Figure 1:
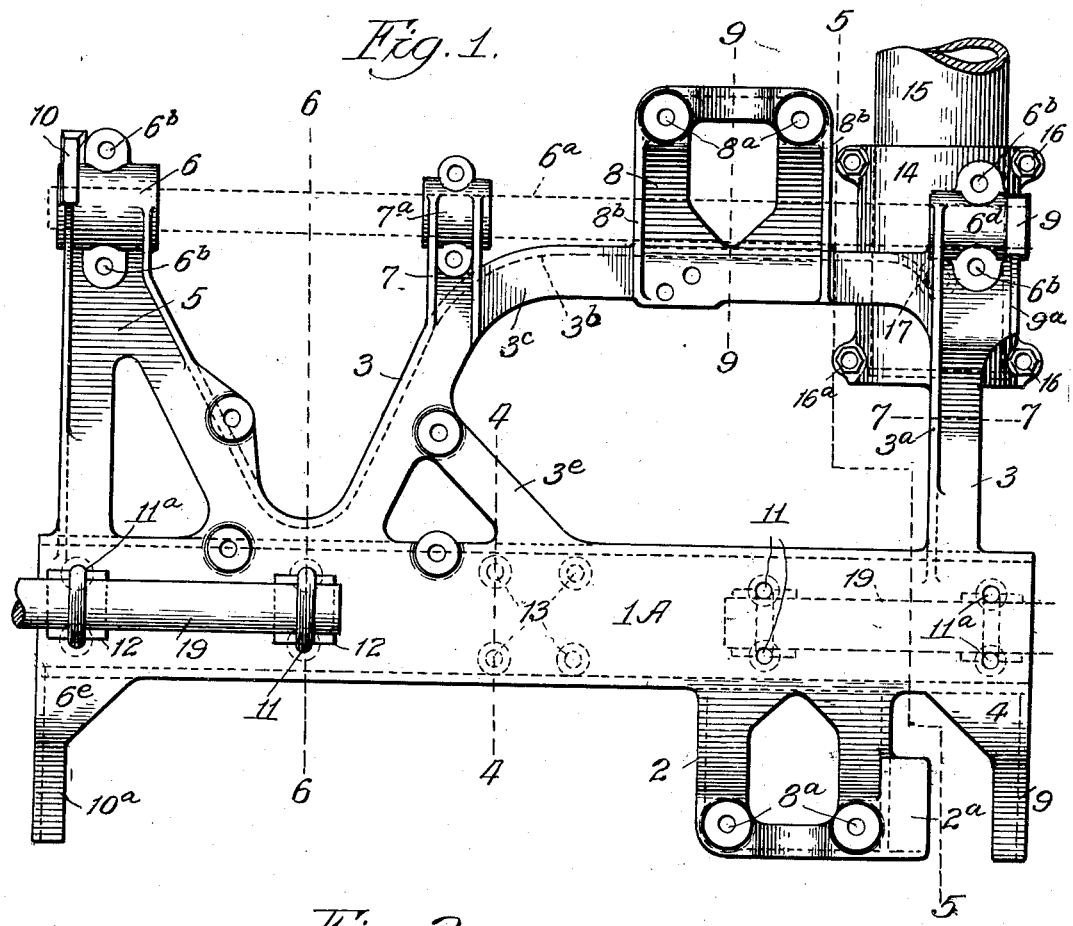
Figure 2:
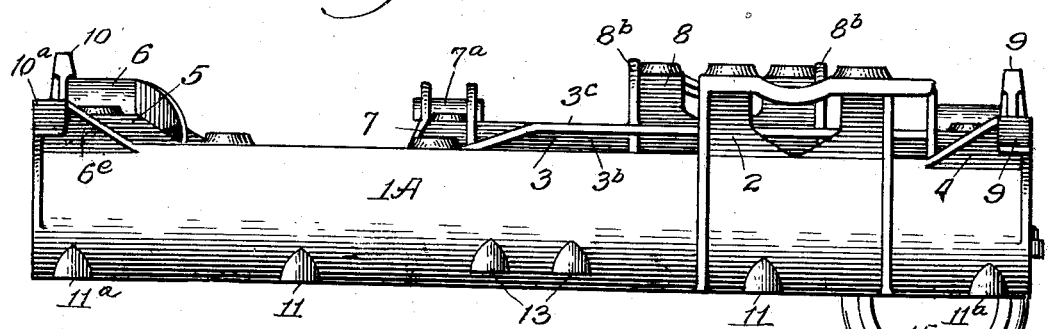

In the drawings: Figure 1 is a plan of a main frame embodying the invention. Fig. 2 is a rear elevation. Fig. 3 is a side elevation, partly broken away, of the connection between the tubular reach and the frame. Fig. 4 is a section taken on line 4—4 of Fig. 1, the draft-bar being shown attached to the frame. Fig. 5 is a section taken on line 5—5 of Fig. 1. Fig. 6 is a section taken on line 6—6 of Fig. 1. Fig. 7 is a section taken on line 7—7 of Fig. 1. Fig. 8 is a left side elevation, the tubular strut being shown in section across the line of the bolt-holes for securing the axle thereon. Fig. 9 is a section taken on line 9—9 of Fig. 1. Fig. 10 is a right-hand elevation of a tractor embodying the frame, the right-hand wheel being omitted. Fig. 11 is a detail showing the connection of the exhaust pipes from the motor to the reach.

1$^A$ indicates a main frame, having a main sustaining portion in the form of a tubular strut extending transversely of the frame. 2 indicates a bracket extending rearwardly and upwardly from the right-hand portion of the strut provided with bosses having bolt-holes 8$^a$ and a shelf portion 2$^a$. 3 indicates a bracket integral with, and extending forwardly from, the strut with vertical and horizontal portions 3$^b$ and 3$^c$. 3$^a$ is a vertical rib extending over the right longitudinal member of 3 for strengthening the bracket 6$^d$ carrying the right hand boxing for the transverse shaft, having the holes 6$^b$ for securing the under-half box, (see Figs. 1, 3 and 5). 3$^e$ is an angular brace on bracket 3 for strengthening the same. 4 is an integral bracket formed on the rear right end of the tubular strut 1, carrying the rear bracket 9 for sustaining the rear end of a shield for covering the right carrying wheel. 5 is a bracket integrally attached to the forward side of the left end of the strut 1, carrying the left box 6 for the transverse shaft, the latter being provided with the clamping bolt holes 6$^b$. 7 is a sub-bracket attached to the left forward portion of the bracket 3 and carrying the center box 7$^a$ for the transverse shaft 6$^a$. 8 indicates a forward engine-carrying bracket extending from the central forward portion of the bracket 3, provided with strengthening ribs 8$^b$ and with clamping bolt-holes 8$^a$. 9 indicates the front and rear brackets for sustaining the right-hand shield for the right wheel, the forward bracket being sustained upon the right-hand shaft-bracket 6$^d$ and strengthened by the rib 9$^a$. 10 indicates a forward shield-bracket sustained on the left boxing bracket 6 and 10$^a$, a rear shield sustaining bracket mounted on the rear bracket 6$^e$ formed on the strut 1. 11 and 11$^a$ indicate holes through the strut for bolts clamping the stub-axles 19 to the strut.

12 indicates a self-centering bearing-block upon which the sub-axles 19 are sustained, one of these bearing blocks 12 being placed between each of the rear and forward holes 11 and 11$^a$. 13 indicates holes in the bottom of the strut, as shown in the detail of Fig. 4 for attaching the central draw-bar by means of bolts and nuts 13$^a$.

14 is a sub-bracket attached to the forward right-hand corner of the bracket 3, in arc form, to coincide with the outer surface of the tubular reach 15, and provided with clamping bolt holes 16 for securely attaching the tubular extension to the bracket 14 by means of the U bolts 16$^a$, as shown in Fig. 7. 17 is a downwardly projecting lug formed on the under surface of the curved bracket 14 and fitting within an orifice in the reach 15 for preventing a transversely rotative movement of the reach with relation to the frame (see Figs. 1, 3 and 7).

20 indicates a draw-bar attached to the central portion of the strut by means of bolts and nuts 13ª through the bolt-holes 13, as indicated in Fig. 4, provided on its upper surface with a bracket 21, having bolt-holes 22 for attaching a seat spring and seat. At its rear end, the hole 23 is provided for receiving a clevis for the attachment of a plow or other structure to be drawn by the tractor. Rigidly attached to each of the extremities of the transverse-shaft 6ª is a pinion 24 shown in section only in Fig. 10, having teeth meshing in gearings 25, attached toward the peripheries of the sustaining and driven wheels 26, in which, at either side of the structure, are mounted the stub-axles 19, the stub-axles being the means by which the frame portion of the structure is sustained in the wheels.

27 indicates a radiator attached intermediate of the length of the tubular extension 15, by means of the clamping bolt 28, and properly connected to the engine.

A and A¹ indicate an opposed cylinder-engine mounted on the forward and rear brackets 8 and 2 and properly clamped through the bolt-holes 8ª.

A² indicates the exhaust chambers of the engine to which are attached exhaust pipes A³ leading therefrom to a common chamber A⁴, inserted in the rear of the tubular reach 15 below the bracket 14 and held therein by pins A⁵. 29 indicates a front steering wheel bracket rigidly clamped to the forward end of the tubular reach 15 by the U bolts 30 and carrying at its forward upper end a socket 31 in which is mounted the circular shank of a fork 32, in which is rotatively mounted the front sustaining wheel 33. Above the socket 31, and on the shank of the fork 32, is attached a section of the worm-wheel 34, gearing with worm 35, which is rigidly affixed to the rod 36 extending backwardly and provided with a hand-wheel not shown, the rear end of the rod 36 being sustained in a bracket 37 suitably attached to the shelf 2ª on bracket 2, shown in Figs. 1 and 10.

It is manifest from the above description that the structure described will give a maximum of strength with a minimum of weight and material, and a structure that is compact, readily accessible, and very little liable to breakage.

It is to be understood that while my invention is embodied in the structure shown and described herein, its scope is not limited to the precise structure shown and described.

Having thus described the invention, what I claim as new and desire to secure by Letters Patent, is:

1. In a tractor, the combination with sustaining wheels, of a main frame having a transverse tubular strut, a wheel spindle sustained on the outside of the strut and engine-supporting means integral with said frame.

2. In a tractor, the combination with sustaining wheels, of a main frame comprising a transverse tubular strut, a wheel axle sustained on the frame exteriorly of the strut, a removable connection between the frame and the axle, and engine-supporting means integral with the frame.

3. In a tractor, the combination of sustaining wheels, with a main frame comprising a transverse tubular strut supported in the wheels, means for securing an engine to the strut comprising longitudinally extending brackets integrally secured to the strut, an engine, and a driving connection between the engine and the wheels.

4. In a tractor, the combination of sustaining wheels, with a main frame comprising a transverse tubular strut supported in the wheels, means for supporting an engine on the strut comprising longitudinally extending brackets integrally secured to the strut, said brackets being in angular form in cross-section.

5. In a tractor, the combination of sustaining wheels, with a main frame comprising a transverse tubular strut supported in the wheels, engine-sustaining brackets integrally attached to the strut, a longitudinally extending tubular member carrying a steering wheel, a bracket on the strut for securing the tubular member to the strut, means for securing the tube to the bracket, and a lug on the bracket for holding the tube against rotative movement.

6. In a tractor, the combination of sustaining wheels, with a main frame comprising a transverse tubular strut supported in the wheels, a bracket extending longitudinally from the strut, a longitudinally extending tubular member, a bracket, means for securing the tube to the bracket comprising U bolts, and means comprising a lug for securing the tubular member against rotative movement.

7. In a tractor, the combination with sustaining wheels, of a main frame comprising a tubular strut, a wheel axle connected to the outside of the strut and integral means on the strut, and a draw-bar rigidly secured to said means.

8. In a tractor, the combination with sustaining wheels, of a main frame comprising a tubular strut, a wheel axle connected to the outside of the strut, a draw bar secured to the strut, and means on the draw-bar for sustaining a seat.

9. In a tractor, the combination of sustaining wheels, with a main frame comprising a transverse tubular strut supported in the wheels, a bracket extending longitudinally from the strut, a longitudinally extending tubular member, a bracket, means for securing the tube to the bracket comprising U bolts, and means comprising a lug on the bracket and an orifice in the tubular member to secure the tubular member against rotative movement.

10. In a tractor, the combination of sustaining wheels with a main frame comprising a transverse tubular strut sustained in the wheels, a main bracket on the strut extending substantially at right angles to the strut and having diagonal braces on one side thereof connecting the bracket with the strut.

11. In a tractor, the combination of sustaining wheels, with a main frame comprising a transverse tubular strut sustained in the wheels, means for sustaining an engine on the strut comprising a rearwardly extending bracket on the strut, and a forwardly extending bracket on the strut comprising a main bracket, sub-brackets formed on the main bracket and diagonal bracing portions between the main bracket and the strut.

12. In a tractor, the combination of sustaining wheels, with a main frame comprising a transverse tubular strut sustained in the wheels, means for sustaining an engine on the strut, comprising rearwardly and forwardly extending brackets formed integrally with the strut, the forward bracket comprising a main portion and sub-brackets formed thereon and diagonal bracing portions between the main bracket and the strut.

13. In a tractor, the combination of sustaining wheels, with a main frame comprising a transverse tubular strut sustained in the wheels, means for sustaining an engine on the strut comprising rearwardly and forwardly extending brackets formed integrally with the strut, the forward bracket comprising a main portion and sub-brackets formed thereon, diagonal bracing portions between the main bracket and the strut, and a longitudinal tubular extension rigidly secured to one of the sub-brackets.

14. In a tractor, the combination of sustaining wheels, with a main frame comprising a transverse tubular strut sustained in the wheels and a plurality of integral brackets extending longitudinally therefrom, and means for securing an engine to a plurality of the brackets.

15. In a tractor, the combination of carry-wheels, with a main frame comprising a transverse strut, a plurality of brackets extending longitudinally from the strut, a sub-bracket on one of the brackets, longitudinal extension carrying a steering wheel and means for rigidly attaching the extension to the sub-bracket.

LEE W. MELCHER.